A. JIMENEZ.
RESILIENT WHEEL.
APPLICATION FILED APR. 11, 1919.
1,342,289.
Patented June 1, 1920.
2 SHEETS—SHEET 1.
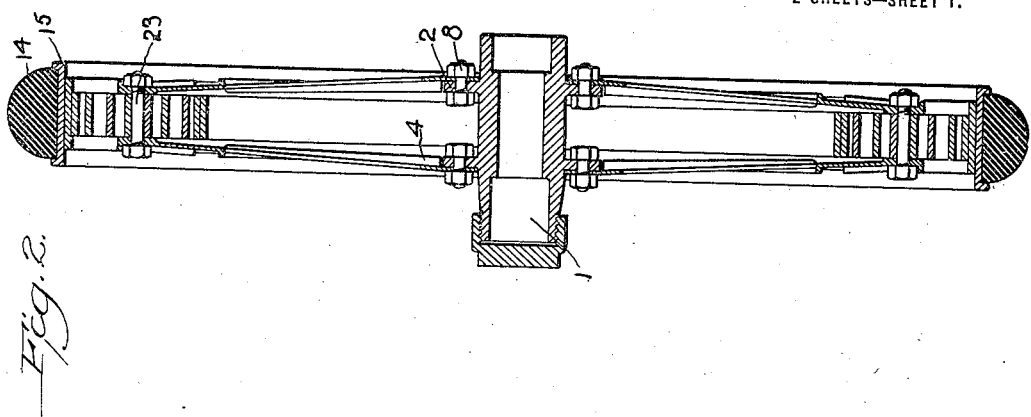
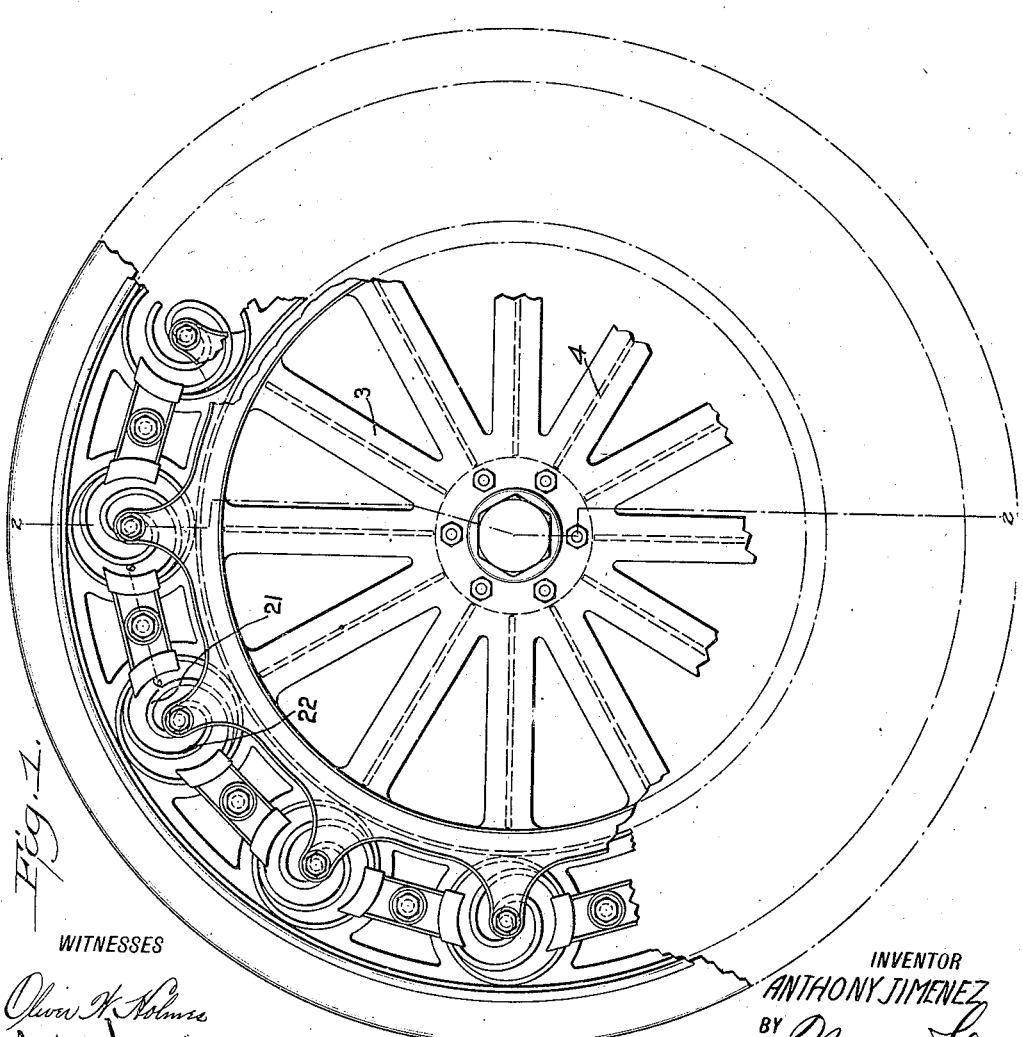
WITNESSES
INVENTOR
ANTHONY JIMENEZ
BY
ATTORNEYS

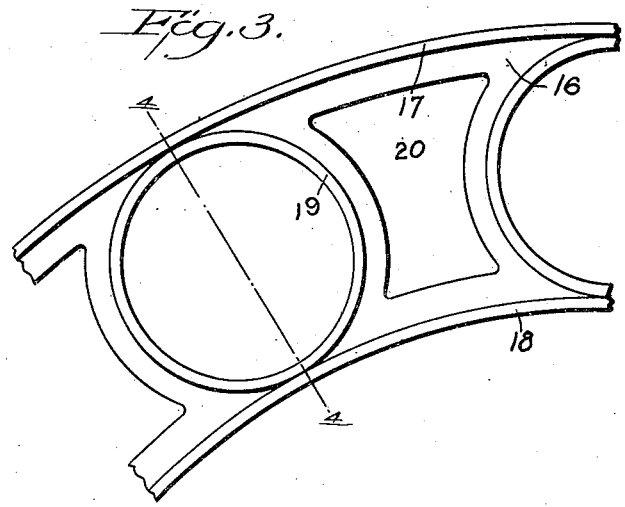
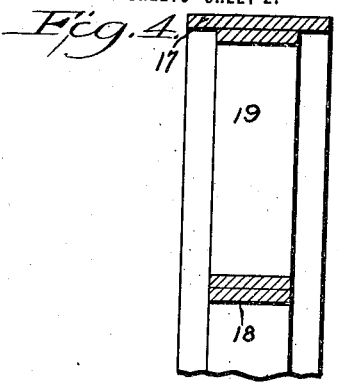
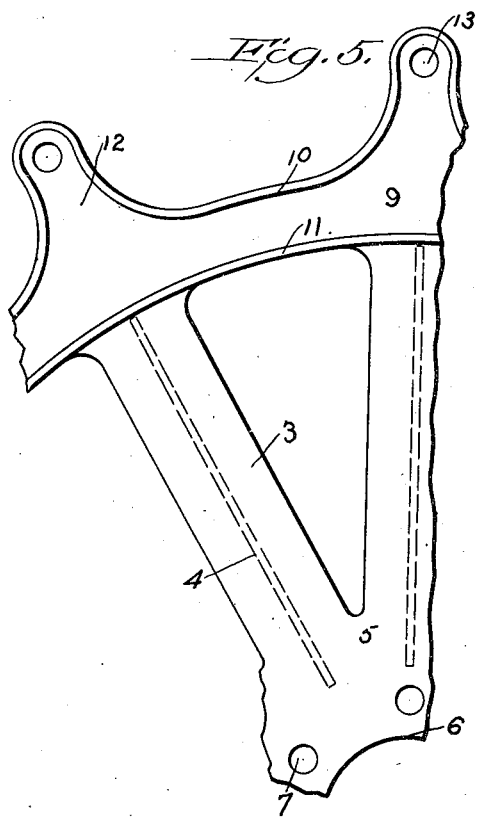
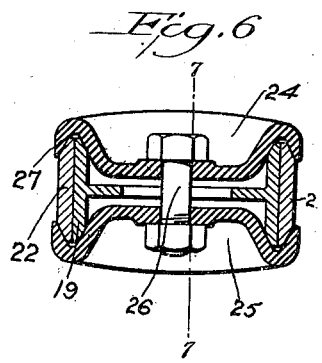
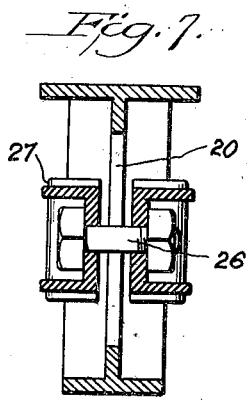

UNITED STATES PATENT OFFICE.

ANTHONY JIMENEZ, OF NEW YORK, N. Y.

RESILIENT WHEEL.

1,342,289.  Specification of Letters Patent.  Patented June 1, 1920.

Application filed April 11, 1919. Serial No. 289,316.

*To all whom it may concern:*

Be it known that I, ANTHONY JIMENEZ, a subject of the King of Spain, and a resident of the city of New York, borough of Manhattan, in the county and State of New York, have invented a new and Improved Resilient Wheel, of which the following is a full, clear, and exact description.

This invention aims to provide a wheel which will incorporate construction, which will make it possible to dispense with the conventional pneumatic tire, which has always been a great source of trouble and expense.

It is well known that it has been common in the art, to provide a wheel, having the same object as my invention, in which the spokes telescope and are provided with resilient means, which will render them capable of cushioning effect. In practice, however, it has been found that the telescoping spoke feature is impractical, in view of the difficulty experienced in keeping the movable members free from dirt, which results in undue friction of the parts and consequential rapid wearing of the same, together with unsatisfactory operation.

It has further been proposed to provide various other forms of resilient wheels, few of which have been placed on the market, in view of difficulties of manufacture, or inefficient operation.

My invention contemplates the provision of a wheel of the resilient type, in which the movable parts are entirely exposed, so that they may be readily cleaned, in which no more oil is required than the usual chassis springs and in which, no matter how caked with mud, or other matter, they might become, the parts will always operate positively, in view of the absolute simplicity of the construction involved.

A further object of my invention is to provide a wheel of the aforementioned class, in which the resilient effect is produced by means of apparatus located between the ends of supporting members extending between the axle and the lower part of the rim, and the rim itself.

The final object of my invention is to provide a device of this nature, which will be so simple in construction, yet positive in operation as to combine the essential features of lightness, cheapness in manufacture, and practicalness.

Reference is had to the attached sheets of drawings which illustrate one practical embodiment of my invention, and in which—

Figure 1 is a side elevational view of a wheel constructed in accordance with my invention;

Fig. 2 is a sectional elevation taken on lines 2—2 of Fig. 1;

Fig. 3 is an enlarged side elevation of the body portion of the rim;

Fig. 4 is a sectional view taken along lines 4—4, Fig. 3;

Fig. 5 is an enlarged detail view of the supporting members extending between the axle and the rim;

Fig. 6 is an enlarged detail view of the clamping means employed in connection with the apparatus providing resiliency and Fig. 7 is a sectional view taken along line 7—7, Fig. 6.

In these various figures like reference numerals designate similar parts and the reference numeral 1 indicates an axle of any conventional construction. Secured to the axle, and preferably integral therewith, are two annular shoulders 2, which are formed with openings. Rim supporting means, including spokes 3, having secured to their inner faces and also preferably integral therewith, reinforcing ribs 4, are joined together at their inner ends as indicated at 5, an opening 6 being provided through which the ends of the axle 1 are adapted to project. Adjacent to the edges of the opening 6 are cut or otherwise formed, bolt openings 7, which are adapted to aline with the openings formed through the annular shoulders 2, bolts 8 passing through both of such openings and securing the rim supporting means to the axle 1.

Secured to the outer ends of the spokes 3 is an annular band 9, preferably provided at its outer and inner edges with reinforcing flanges 10 and 11 respectively. The outer edge of the band 9 is provided with projecting lugs 12, which form continuations of the upper edge of the band 9 and are provided adjacent short end portions with openings 13.

I preferably use a solid rubber tire as indicated at 14, which tire may be mounted in any conventional type of rim 15, to the under side of which is secured by welding or any suitable fastening members, a ring 16 including outer and inner flanges 17 and 18, respectively. Between these flanges are provided circular openings, formed with annular flanges at adjacent edges as indicated at 19 and between such circular openings portions of the ring 16 are cut out, as indicated at 20, for the purpose hereinafter more fully specified. Housed within each of the circular flanges 19 is a resilient unit including springs 21 and 22, which have one of their ends extending outwardly and bearing against the inner face of the flange 19 and extend from such flanges in the form of a spiral between the center of the opening and have their ends engaging one another and secured in this position by means of bolts 23 extending between the lugs 12 and through the openings 13 therein.

Obviously, the ends of the springs 21 and 22 bearing against the inner face of each flange 19, would become displaced upon movement of the axle, and consequently the band 9 with respect to the ring 16. To overcome this defect, I provide members adapted to clamp the ends of such springs which bear against the inner face of the flanges 19 at a point adjacent to one another in each respective opening, together, such means extending between such openings. Briefly described, this securing means includes a pair of bars 24 and 25, which are provided with an opening located approximately central in each member and through which extends a bolt and nut 26. Secured to the ends of the bars, or integral therewith, are hook-shaped portions 27, which engage the ends of springs 21 and 22 located in different openings and clamp such ends firmly to the flanges 19, it being noted that the bolt 26 passes through the opening 20 formed in the ring 16.

Having now described the structure embodied in this invention, it will be seen in operation that upon the parts being arranged and retained in place in the manner illustrated in the assembled views, that if the wheel is rotated and a weight supported by the axle 1, together with unevenness in the road over which the wheel travels, that the axle 1 will float with respect to the tire 14, in that the tire 14 will always be firmly in engagement with the road, but due to the load, pressing downwardly upon the axle 1, and sudden rises in the surface over which the tire 14 is traveling, the axle 1 will move in as variable a vertical plane as the one through which they move, this being the case with any ordinary wheel. However, the supporting member including the spokes 3, etc., will move downwardly due to the weight exerted upon the axle 1, as well as its inertia when the tire 14 moved upwardly suddenly, and lugs 12 will move downwardly with such axle 1. Now, by virtue of the connection existing between the lugs 12 and the flanges 19, consisting of the spring means 21 and 22, the springs will absorb the greater part of the shocks imparted to the tire 14, so that the same will not be felt to any appreciable extent at the axle 1.

It will further be understood that in view of the simplicity of construction embodied in my wheel, no oiling, beyond enough to prevent rusting of the springs, is necessary. If the space inclosed by the flanges 19 should become caked with mud, it is obvious that the same would hardly interfere with the positive operation of this wheel, and, further, should it be desired to clean the accumulation of matter from these openings, a hose may be turned upon the wheel, which will result in the cleansing of every part of the same, for which reason, not a single part of my wheel is housed, or not entirely visible from the outside.

Further, it will be appreciated that the parts of this wheel, permitting the resiliency which is incorporated in the same, may be readily renewed upon breakage in view of the aforestated simplicity of construction.

Having thus described my invention, what I claim as new is:

1. A resilient wheel including a rim, a body portion below such rim, such body portion being formed with circular openings, springs positioned within said openings, and clamping means extending between such openings and being adapted to retain the outer ends of such springs in applied position.

2. A resilient wheel including a rim, a body portion for such rim extending below the same, such body portion being formed with circular openings, a pair of springs extending spirally within each of such openings, their inner ends bearing against the face of the same, and clamping means extending between such openings and being adapted to secure in applied position the outer ends of one of such springs in each opening.

3. A resilient wheel including a rim, a body portion for such rim extending below the same, such body portion being formed with circular openings, a pair of springs extending spirally within each of such openings, their inner ends bearing against the face of the same, and clamping means extending between such openings and being adapted to secure in applied position the outer ends of one of such springs in each opening, such clamping means including a pair of bars formed with notched ends, and means for drawing such bars toward each other.

4. A resilient wheel including a rim, a body portion positioned below such rim, such body portion being formed with circular openings and further openings between said circular openings, resilient means positioned within such circular openings, and clamps for retaining such resilient means in applied position, and a bolt and nut extending through the second-named openings for drawing such clamping means together.

ANTHONY JIMENEZ.